United States Patent [19]

Olund

[11] 4,199,461

[45] Apr. 22, 1980

[54] REFRIGERATION OIL CONTAINING WEAR-INHIBITING AMOUNTS OF AN ARYL PHOSPHATE-FATTY ACID COMBINATION

[75] Inventor: Sven A. Olund, San Rafael, Calif.

[73] Assignee: Chevron Research Company, San Francisco, Calif.

[21] Appl. No.: 951,554

[22] Filed: Oct. 16, 1978

Related U.S. Application Data

[63] Continuation-in-part of Ser. No. 822,109, Aug. 5, 1977, abandoned, which is a continuation-in-part of Ser. No. 768,305, Feb. 14, 1977, abandoned.

[51] Int. Cl.$^2$ .......................... C09K 5/04; C10M 3/40; C10M 1/46
[52] U.S. Cl. ..................................... 252/49.8; 252/68
[58] Field of Search ................... 252/68, 11, 59, 49.8, 252/49.9, 56 R, 389 A, 400 A

[56] References Cited

U.S. PATENT DOCUMENTS

| 2,203,102 | 6/1940 | Powers | 252/49.8 |
|---|---|---|---|
| 2,730,499 | 1/1956 | Pokorny | 252/49.8 |
| 2,824,061 | 2/1958 | Davidson et al. | 252/68 X |
| 3,074,886 | 1/1963 | Tierney et al. | 252/49.8 |
| 3,092,981 | 6/1963 | Begeman et al. | 252/68 X |
| 3,129,185 | 4/1964 | Rizzuti et al. | 252/68 |
| 3,169,928 | 2/1965 | Herold | 252/68 |
| 3,375,197 | 3/1968 | Spauschus et al. | 252/68 |
| 3,449,459 | 6/1969 | Asfazadourian | 252/68 X |
| 3,642,634 | 2/1972 | Olund | 252/68 X |
| 4,046,533 | 9/1977 | Olund | 252/68 X |

FOREIGN PATENT DOCUMENTS 1413765  8/1965  France .

*Primary Examiner*—Harris A. Pitlick
*Attorney, Agent, or Firm*—D. A. Newell; John Stoner, Jr.

[57] ABSTRACT

Refrigeration or heat pump apparatus containing working fluid consisting essentially of refrigerant and lubricant, said refrigerant being a halo-substituted hydrocarbon of 1 to 3 carbon atoms and preferably at least 40% by weight fluorine, and said lubricant being mineral lubricating oil, poly-alpha-olefin lubricating oil, synthetic alkylbenzene lubricating oil or mixtures thereof containing the combination of higher fatty acid and arylphosphate in a minor amount, sufficient to improve the wear-inhibiting properties of said lubricant and to improve the resistance of said lubricant to decomposition.

9 Claims, No Drawings

REFRIGERATION OIL CONTAINING WEAR-INHIBITING AMOUNTS OF AN ARYL PHOSPHATE-FATTY ACID COMBINATION

CROSS-REFERENCE TO RELATED APPLICATION

This application is a continuation-in-part of U.S. application Ser. No. 822,109, filed Aug. 5, 1977, now abandoned, which in turn is a continuation-in-part of U.S. application Ser. No. 768,305, filed Feb. 14, 1977, now abandoned.

BACKGROUND OF THE INVENTION

1. Field of the Invention

This invention relates to refrigeration or heat pump apparatus containing stable wear-inhibiting working fluid consisting essentially of a refrigerant and a chemically inert wax-free lubricant. More particularly, the invention concerns such apparatus and working fluids in which the refrigerant is a halo-substituted hydrocarbon and the lubricant contains the combination of higher fatty acid and arylphosphate to improve wear-inhibiting properties and to improve resistance to decomposition.

2. Prior Art

Mineral lubricating oils have been developed containing the combination of triarylphosphate such as tricresylphosphate and higher fatty acids such as oleic acid in order to improve lubricating properties. See, for instance, U.S. Pat. Nos. 2,241,531, 2,431,008 and 2,730,499.

Refrigeration apparatus and working fluids in such apparatus have been developed in which mineral lubricating oil is used as lubricant and various additives such as ethylene diamine tetraacetic acid, or a salt thereof and nitrous oxide are used to inhibit chemical instability of the oil-refrigerant mixture. See, for instance, U.S. Pat. Nos. 3,532,631 and 3,812,040, the former of which also notes that tricresylphosphate additive accelerates oil-refrigerant reaction.

Refrigeration apparatus and working fluids in such apparatus have also been developed in which synthetic alkylbenzene lubricating oil is used as lubricant, but it appears that wear-inhibiting and stabilizing additives for such fluids have not been suggested. See, for instance, U.S. Pat. Nos. 3,092,981, 3,169,928 and 3,642,634, as well as French Patent No. 1,413,765.

THE INVENTION

In accordance with the present invention, an improved refrigeration or heat pump apparatus is provided in which said apparatus contains a working fluid consisting essentially of a refrigerant and a chemically inert, wax-free lubricant, said refrigerant being a halo-substituted hydrocarbon having from 1 to 3 carbon atoms and said lubricant being an oil of lubricating viscosity selected from the group consisting of mineral lubricating oil, polyalpha-olefin lubricating oil alkylbenzene lubricating oil and mixtures thereof, the improvement comprising incorporating in said oil the combination of higher fatty acid and arylphosphate in minor amounts sufficient to improve the wear-inhibiting properties of said lubricant and to improve the resistance of said lubricant to decomposition.

The refrigerant or heat pump apparatus and working fluid of the invention exhibit wear-inhibiting properties and resistance to decomposition due to the use of the particular combination of higher fatty acid and arylphosphate.

EMBODIMENT

The refrigerant is a fluorinated, chlorinated methane, ethane or propane of the Freon type. The more suitable fluorinated halogenated hydrocarbon refrigerants contain at least about 40% by weight of fluorine. Examples of satisfactory compounds are:
difluoromonochloromethane,
difluorodichloromethane,
monofluorotrichloromethane,
1,2-dichloro-1,1,2,2-tetrafluoromethane,
1,1-difluoroethane,
trifluorochloromethane,
pentafluorobromoethane,
and mixtures thereof.

The chemically inert, wax-free lubricant is a typical refrigerant oil. Such refrigeration oils are classified on the basis of viscosity at 100° F. Grades having normal viscosities of 80, 100, 150, 200, 300 and 500 SUS (Saybolt universal seconds) at 100° F. are provided. More refrigeration equipment requires the grades covering the range from 150 to 500 SUS.

The mineral lubricating oil may be any suitable refined hydrocarbon oil of lubricating viscosity known for use as "refrigeration oils". Such oils include paraffinic or naphthenic base oils having viscosities in the range of from about 50 to 2000 SUS at 100° F. Commercially available oils of this type include "Suniso" 3GS, white oil and "Capella" B oil.

The polyalpha-olefin lubricating oils are hydrogenated oligomers of alpha-olefins having about 8 to 12, preferably 10, carbon atoms. The final oligomer may have from 20 to 100 carbon atoms. The preferred polyalpha-olefin lubricants are those having a viscosity of 50 to 2000 SUS at 100° F. These are the compounds having about 30 to 60 carbon atoms per molecule.

The alkylbenzene lubricating oils are superior to conventional oils in compatability with the refrigerant and in thermal stability, and are thus preferred. Such oils consist essentially of alkylbenzenes having one or more side chains of 1 to 25 carbon atoms and containing a total of from 10 to 25 carbon atoms in the alkyl groups. Suitable alkylbenzene refrigeration oils, as in the case of the mineral lubricating oils, have viscosities in the range of from about 50 to 2000 SUS at 100° F.

The alkylbenzene lubricants are particularly suitable by reason of their superior compatibility with the high-fluorine-content halogenated hydrocarbons containing at least 40% by weight of fluorine.

The alkyl group of the more preferred alkylbenzenes in the compositions of the invention must be branched, having at least one branch per every five, preferably four, carbon atoms. The most preferred alkyl group is one having one branch per every three carbon atoms and is prepared by polymerization of propylene. In the alkyl chain, branching is determined by dividing the number of carbon atoms connected to three other carbon atoms plus two times the number of carbon atoms connected to four other carbon atoms by the total number of carbon atoms in the alkyl group.

Alkylbenzenes for this use are prepared by alkylating benzene with an alkylating agent in the presence of a catalyst. Typical alkylating agents are the branched-chain olefins or branched-chain halides, preferably chlorides. The preferred method of preparation is by the HF-catalyzed reaction of benzene with a branched-chain olefin.

Satisfactory alkylbenzenes have an average molecular weight in the range of 300 to 470 and can be prepared from the following branched-chain olefins:
- hexapropylene;
- pentaisobutylene;
- a mixed $C_{16-28}$ polypropylene-polyisobutylene blend;
- oligomers of propylene and the 4 to 9 carbon atom 1-olefins in a mol ratio greater than 75/25, respectively;
- 4,6-dimethyl-8-isobutyl-3-dodecene;
- 2,4-dimethyl-5-isobutyl-5-dodecene;
- 4,6,8,12-tetramethyl-10-ethyl-9-tridecene;
- 2,4,6,8,10-pentamethyl-2-tridecene;
- 2,4,6,8,10,12-hexamethyl-2-pentadecene;
- 4,6,8,10-tetramethyl-2-hexadecene;
- 4,6,8,10,12,14-hexamethyl-2-nonadecene;
- 2,4,6,8,10,12-hexamethyl-2-eicosene;
- 2,4,6,6,8,10,10,12-octamethyl-2-tridecene, etc.

The preferred olefin is a blend of polypropylene having from 18 to 24 carbon atoms. The preferred alkylbenzenes have a molecular weight in the range of 325 to 415.

The alkylbenzene mixtures of this invention have viscosities in the range of 80 to 800 SUS (measured at 100° F.), preferably in the range of 150 to 500. Three viscosity grades of lubricants are conventionally supplied for use in refrigeration apparatus: 150 SUS, 300 SUS and 500 SUS. The mixtures of alkylbenzenes herein described may be tailored to any one of these three grades, but the 150 SUS grade is preferred and is obtained from branched-chain alkylbenzenes produced by HF alkylation of benzene with mixed polypropylenes having an average molecular weight in the range of 330 to 350. The alkylbenzenes are primarily monosubstituted alkylbenzene, but may contain minor proportions of polyalkylaryl hydrocarbons within the aforesaid molecular weight ranges. The alkylbenzenes preferably are dried to contain not more than 30 parts per million of water. Such drying may be accomplished by conventional means such as blowing with an inert gas, including air, nitrogen, helium, etc., and may be accomplished in connection with other treatment—for example, clay treatment, preferably acid-treated clay, used to remove various impurities.

In the refrigeration or heat pump apparatus as a whole, there will be from 10 to 100 parts of refrigerant per part of lubricant. However, in the evaporator, the relative amounts of refrigerant and lubricant undergo a large change as the refrigerant is vaporized. Consequently, it is here that incompatibility becomes a problem. It has been found that maximum incompatibility occurs at about 10% to 20% by weight of lubricant. (See U.S. Pat. No. 3,092,981, FIG. 3; U.S. Pat. No. 3,169,928, FIG. 1). As a result, potential lubricants are usually tested for compatibility at concentrations in this range at ever-lower temperatures. Two measurements can be made: (1) the temperature at which separation first occurs, and (2) the quantity present in the oil-rich phase at successively lower temperatures. Both values are important; a high temperature, voluminous separation would be wholly inoperative, whereas a relatively high-temperature separation of a minute amount of oil which did not change upon going to even lower temperatures may be operative. In general, the separation of more than 5 volume percent oil phase is considered unacceptable.

The higher fatty acid employed in the oil of lubricating viscosity is a monocarboxylic aliphatic acid of at least 8 carbon atoms. Both saturated and unsaturated acids may be used. From the standpoint of compatibility, the fatty acids preferably contain from about 10 to 20 carbon atoms. Examples of suitable acids include caprylic acid, pelargonic acid, undecylic acid, lauric acid, myristic acid, palmitic acid, stearic acid, oleic acid, linoleic acid, etc. Oleic acid is preferred. Minor amounts of fatty acid are sufficient to improve the wear-inhibiting properties of the lubricants and to improve the resistance of said lubricant to decomposition, usually from about 0.01% to 0.5% based on the weight of the lubricant.

The aryl phosphate employed in the oil of lubricating viscosity is a hydrocarbyl phosphate ester having at least one aryl group, preferably a mononuclear aryl group. Such esters contain from about 10 to 25 carbons in the hydrocarbon portion. Acid as well as neutral phosphates may be used, such as diphenylphosphate. Examples of neutral aryl phosphates, which are the preferred phosphates, include butyldiphenylphosphate, dibutylnaphthylphosphate, and triarylphosphates such as triphenylphosphate, and tricresylphosphate. For present purposes, tricresylphosphate is preferred. Minor amounts of arylphosphate are sufficient to improve the wear-inhibiting properties of the lubricant and to improve the resistance of said lubricant to decomposition, usually from about 0.1% to about 2.0% based on the weight of the lubricant.

In addition to the aforementioned higher fatty acid and aryl phosphate, the refrigeration lubricant of the working fluid of the invention may contain additives of the types conventionally used. These include viscosity improvers such as polybutene having viscosities in the range of from about 3000 SUS to 1,000,000 SUS at 100° F.; foam inhibitors such as silicone polymers; metal deactivators such as alizarine, quinizarine, zinc dithiocarbamates, and mercaptobenzothiazole; oxidation inhibitors such as dibuty-p-cresol and scavengers for hydrogen chloride such as epoxides.

EXPERIMENTAL

The following examples further illustrate the improved refrigeration or heat pump apparatus and working fluid therefor according to the present invention. Unless otherwise indicated, the proportions of compositions are on a weight basis.

Experiments were carried out to illustrate the lubricating-enhancement or wear-inhibiting properties of the lubricant compositions employed in the invention. The widely accepted Falex wear test procedures were carried out to show wear-reducing qualities of the lubricants. The Falex test, briefly described, consists of running a rotating steel journal against two stationary steel V-blocks immersed in the lubricant sample. Load is supplied to the V-blocks and maintained by a ratchet loading mechanism. Wear is determined by measuring the weight loss of the journal after the test and by recording the number of teeth of the ratchet mechanism advanced to maintain load constant during the prescribed time. The present tests were carried out in accordance with ASTM D-2670 except that the duration of the tests was 30 minutes. The lubricant was alkylbenzene lubricant derived from the HF-catalyzed alkylation of benzene with polypropylene having a viscosity of about 150 SUS at 100° F. For the purposes of the test, after compounding the oil was saturated with Refrigerant 12, namely: dichlorodifluoromethane. In the tests the load was increased to 200 pounds in 30 seconds, maintained at 200 pounds for 30 seconds, followed by an increase in load at a rate of 200 pounds per minute until 400 or 600 pounds was reached. The Falex wear test data are summarized in Table I.

TABLE I

| No. | Additive | Jaw Load, Lb. | Temp., °F. Start* | End | Teeth Pickup #T | Wear, No. | Mg. |
|---|---|---|---|---|---|---|---|
| 1. | None | 400 | 85 | 194 | 109 | 13 | 23.4 |
| 2 | | | 93 | 196 | 103 | 14 | 32.8 |
| 3 | | | 100 | 214 | 114 | 26 | 34.6 |
| 4 | 0.5% TCP | 400 | 88 | 174 | 86 | 4 | 14.7 |
| 5 | | | 104 | 203 | 99 | 12 | 34.0 |
| 6 | | | 124 | 210 | 86 | 22 | 44.0 |
| 7 | 1% TCP | 400 | 88 | 174 | 86 | 3 | 15.3 |
| 8 | | | 122 | 208 | 86 | 12 | 19.0 |
| 9 | 2% TCP | 400 | 88 | 184 | 96 | 0 | 2.7 |
| 10 | 0.1% Myristic Acid | 400 | 86 | 160 | 74 | 0 | 4.3 |
| 11 | 0.1% MA + 0.5% TCP | | 85 | 150 | 65 | 0 | 0.8 |
| 12 | 0.1% Oleic Acid | 400 | 87 | 166 | 79 | 5 | 4.0 |
| 13 | 0.1% OA + 0.5% TCP | | 85 | 156 | 71 | 0 | 0.4 |
| 14,15 | 0.1% MA | 600 | Shaft broke after 4–5 minutes | | | | |
| 16 | 0.1% MA + 0.5% TCP | | 92 | 180 | 88 | 6 | 4.1 |
| 17 | 0.2% MA + 0.5% TCP | | 90 | 179 | 89 | 4 | 4.8 |
| 18 | 0.1% OA | 600 | Shaft broke after 6 minutes | | | | |
| 19 | 0.1% OA + 0.5% TCP | | 95 | 180 | 85 | 5 | 4.8 |
| 20,21 | 2% TCP | 600 | Shaft broke after 19–20 minutes | | | | |

*Temperature after 400 (600) lb. jaw load was reached.
TCP = Tricresylphosphate
MA = Myristic Acid
OA = Oleic Acid The above test data show that the combination of higher fatty acid and arylphosphate in accordance with the present invention greatly improves the wear-inhibiting properties of the lubricant. Although the higher fatty acid and arylphosphate individually provide improved wear-inhibiting properties, a synergistic effect is obtained by the combination of fatty acid and arylphosphate which provides exceptional improvement. It is significant that when the severity of the tests was increased by increasing the load from 400 to 600 pounds, failure occurred and the journal broke with samples containing fatty acids or tricresylphosphate alone, whereas wear was still low with the combination of fatty acid and tricresylphosphate, as shown by runs 16, 17 and 19.

Stability tests were also carried out to illustrate the resistance of the lubricant to decomposition in a refrigeration or heat pump working fluid. The stability tests were carried out in accordance with the so-called Elsey Test described in the article entitled "A Method of Evaluating Refrigerator Oils" by Elsey et al published July 1952 in *Refrigeration Engineering*, Vol. 60, No. 7, page 737. In this test, R12 Refrigerant (dichlorodifluoromethane) reacts with the hydrocarbon (HC) to form an equal amount of R22 (chlorodifluoromethane) and HCl. The amount of R22 is readily determined by mass spectrometry in accordance with the method of Spauchus et al in the article entitled "Reaction of Refrigerant 12 with Petroleum Oils," published 1961 in the *ASHRAE Journal*, Vol. 3 (2), page 65. The test mixture is heated for 14 days at 175° C. in the presence of copper and steel. The results are expressed as the ratio of R22 to R12 (R22/R12) at the end of the test. The test oil again was alkylbenzene lubricant having a viscosity of 150 SUS at 100° F. The stability test results are summarized in Table II.

TABLE II $$CCl_2F_2 + (HC)_1 \rightarrow CHClF_2 + HCl + (HC)_2$$
R12                        R22

| Additive | R22/R12 | Copper Plating |
|---|---|---|
| None | 0.0006 | Normal |
| 0.5% TCP + 0.1% MA | 0.0005 | Trace |
| 0.5% TCP + 0.1% MA | 0.0007 | Trace |
| 2% TCP + 0.1% MA | 0.0008 | Some |
| 0.5% TCP + 0.1% OA | 0.0002 | None |
| 0.5% TCP + 0.1% OA | 0.0000 | None |
| 2% TCP + 0.1% OA | 0.0008 | Some |

$(HC)_1$ = Hydrocarbon before reaction
$(HC)_2$ = Hydrocarbon after reaction
TCP = Tricresylphosphate
MA = Myristic Acid
CA = Oleic Acid The above test data show that the formation of Refrigerant 22 by decomposition is reduced and copper plating is substantially eliminated with the combination of higher fatty acid and triarylphosphate. This is surprising since, as already noted, tricresylphosphate by itself has been reported to be detrimental to stability.

In addition to the above tests, a typical mineral lubricating oil, namely: Suniso 3GS, was evaluated in the Falex and Elsey Tests. The mineral lubricating oil alone sustained wear of 10.5 and 15.6 milligrams in the Falex Test, while with the combination of 0.1% myristic acid and 0.5% tricresylphosphate the wear was reduced to 1.2 milligrams. In the Elsey Test, the ratio R22/R12 for mineral lubricating oil was 0.003, while with the combination of 0.1% oleic acid and 0.5% tricresylphosphate the R22/R12 ratio was reduced to 0.0005.

Elsey Tests were also carried out on white oil (150 SUS) and on polyalpha-olefin lubricating oil. With white oil, the presence of 0.5% TCP and 0.1% oleic acid reduced the R22/R12 ratio from 0.0025 to 0.0014. For polyalpha-olefin lubricating oil, the same additive concentration reduced the R22/R12 ratio from 0.0033 to 0.0024.

Tests carried out on the miscibility of alkylbenzene and highly fluorinated refrigerant, namely: difluorochloromethane, and a blend of difluorochloromethane and pentafluoroethane showed that the preferred branched-chain alkylbenzenes prepared by HF alkylation of benzene with polypropylene according to the present invention were superior to linear alkylbenzenes at temperatures as low as −40° F., −80° F. and −115° F. In these tests it was found that the linear alkylbenzenes, although superior to mineral lubricating oils in general, would not be suitable lubricants for use in refrigeration apparatus at temperatures below about −40° F. due to the separating out of an unmovable solid phase which causes plugging problems in refrigeration apparatus.

The presence of a fatty acid and an arylphosphate in the quantities specified herein did not affect the miscibility of the refrigerant and lubricant at low temperatures. These additives did not cause foaming in refrigerant use.

Additional wear tests for longer periods of time were carried out. The basis for these tests and the results thereof are given in the following table.

As disclosed, this invention relates to apparatuses of the refrigeration, heat pump or heat engine type including compressor, condenser, evaporator and, in contact with the moving parts of said apparatus, a working fluid comprising halogenated alkanes and a lubricant combination of a lubricating oil, a higher fatty acid and an arylphosphate. For those knowledgeable in the art, it is well known that these apparatuses are variations in the operation of the same cyclic system.

When applied to refrigeration or heat pumps, work is added to the system through a motor-driven compressor which compresses the refrigerant before it is condensed. Heat from the system at this point may be employed for heating purposes. The system is then operating as a heat pump. The condensed refrigerant is partly or completely vaporized in the evaporator. The heat added to the system at this point or extracted from the surroundings causes cooling (refrigeration of the heat source). In heat pumps the heat source is usually outside air, whereas in refrigeration systems it is normally a

TABLE III

FALEX WEAR TESTS - ASTM D-2670
JAW LOAD - 400 LB. DURATION OF TEST - 4.5 HOURS

| Test No. | Oil[1] | Refrigerant | Additive | Temp., °F. Start[2] | End | Δ T | Teeth Pickup, No. | Wear, mg |
|---|---|---|---|---|---|---|---|---|
| 22 | Alkyl- | R12 | None | 90 | 234 | 44[3] | 75[3] | 93.8[3] |
| 23 | benzene | R12 | None | 88 | 216 | 128 | 88 | 102.2 |
| 24 | | R22 | None | 84 | 211 | 127 | 50 | 50.5 |
| 25 | | R12 | 2% TCP | 90 | 240 | 150 | 31 | 36.2 |
| 26 | | R12 | 0.5% TCP + 0.1% OA | 82 | 201 | 119 | 0 | 1.6 |
| 27 | | R22 | 0.5% TCP + 0.1% OA | 81 | 160 | 79 | 0 | 0.4 |
| 28 | Mineral | R12 | None | 87 | 230[4] | 143[4] | 73[4] | 236.9[4] |
| 29 | lub. oil | R22 | None | 82 | 221[5] | 139 | 41 | 156.8 |
| 30 | | R12 | 2% TCP | 82 | 223 | 141 | 25 | 30.9 |
| 31 | | R12 | 0.5% TCP + 0.1% OA | 80 | 177 | 97 | 0 | 0.3 |
| 32 | | R22 | 0.5% TCP + 0.1% OA | 86 | 164 | 78 | 0 | 0.3 |
| 33 | Alkyl | None | None | 100 Failed after about ½ min. | | | | |
| 34 | benzene | None | 0.5% TCP + 0.1% OA | 88 | 190 | 102 | 5 | 4.5 |
| 35 | Mineral | None | None | 82 Failed after about 15 min. | | | | |
| 36 | lub. oil | None | 0.5% TCP + 0.1% OA | 82 | 191 | 109 | 16 | 13.6 |
| 37 | | None | 0.1% TCP | 78 | 205 | 127 | 56 | —[6] |
| 38 | | None | 2% TCP | 78 | 207 | 129 | 61 | —[7] |
| 39 | | None | 0.1% OA | 77 | 132 | 55 | 13 | —[8] |

[1]Oil saturated with refrigerant. Load increased to 200 lb in 30 sec, maintained at 200 lb for 30 sec. Followed by an increase in load at a rate of 200 lb/min. until 400 lb was reached.
[2]Temperature after 400-lb Jaw load reached.
[3]At 175 min, test discontinued, could not maintain 400-lb load.
[4]At 195 min, could not maintain 400-lb load.
[5]At 150 min, could not maintain 400-lb load.
[6]Failed after about 54 min.
[7]Failed after about 79 min.
[8]Failed after about 9 min.

In other tests the effectiveness of compositions of the invention containing 50/50 mixtures of mineral lubricating oil and synthetic alkylbenzene lubricating oil was demonstrated. The mineral lubricating oil was Suniso 3GS, as noted above, and the synthetic alkylbenzene lubricating oil was 150 SUS branched-chain alkylbenzenes produced by HF alkylation of benzene with mixed polypolypropylenes having an average molecular weight in the range 330 to 350. The test oil was saturated with refrigerant R12. With the combination of 0.05% by weight of oleic acid and 0.25% by weight of tricresylphosphate, wear of only 0.1 milligram was obtained in the Falex Test operating at 400 pounds for 4.5 hours. In the Elsey Test the ratio for R22/R12 for the same mixed oils containing oleic acid and tricresylphosphate was 0.0005 and there was no copper plating. By comparison, the mixed oils without the oleic acid and tricresylphosphate gave an R22/R12 ratio of 0.0019 and there was copper plating.

relatively confined space to be cooled.

When the system is operated as a heat engine, useful work is delivered by the system. Heat is added to the evaporator from, for instance, hot gases obtained from combustion of a suitable fuel. This results in evaporation and expansion of the "refrigerant" which drives a compressor. The "refrigerant" is then condensed to complete the cycle. The useful work can, in turn, be used in driving other devices. This type of heat engine is of particular importance because of its possible adaptation to anti-pollution automobile engines employing external combustion.

The same working fluids are used in all three types of the above-described apparatus.

While the character of this invention has been described in detail with numerous examples, this has been done by way of illustration only and without limitation of the invention. It will be apparent to those skilled in the art that modifications and variations of the illustrative examples may be made in the practice of the invention within the scope of the following claims.

I claim:

1. In a refrigeration or heat pump apparatus containing a working fluid consisting essentially of a refrigerant and a chemically inert, wax-free refrigeration oil, said refrigerant being a halo-substituted hydrocarbon having from 1 to 3 carbon atoms and said refrigeration oil being alkylbenzene lubricating oil, the improvement which comprises incorporating into said oil the combination of higher fatty acid and hydrocarbyl phosphate ester of from about 10 to 25 carbon atoms having at least one aryl group in synergistic minor amounts sufficient to improve the wear-inhibiting properties of said refrigeration oil and to improve the resistance of said refrigeration oil to decomposition.

2. Improved refrigeration or heat pump apparatus in accordance with claim 1 in which the refrigeration oil is an alkylbenzene lubricating oil.

3. Improved refrigeration or heat pump apparatus in accordance with claim 2 in which the alkylbenzene is a mixture of mono-substituted branched-chain alkylbenzenes having an average molecular weight in the range of from about 300 to about 470.

4. Improved refrigeration or heat pump apparatus in accordance with claim 3 in which the higher fatty acid is oleic acid and the hydrocarbyl phosphate ester is tricresylphosphate.

5. A refrigeration or heat pump working fluid consisting essentially of a refrigerant and a chemically inert, wax-free refrigeration oil, said refrigerant being a halo-substituted hydrocarbon having 1 to 3 carbon atoms and said refrigeration oil being alkylbenzene lubricating oil containing the combination of higher fatty acid and hydrocarbyl phosphate ester of from about 10 to 25 carbon atoms having at least one aryl group in synergistic minor amounts sufficient to improve the wear-inhibiting properties of said refrigeration oil and to improve the resistance of said refrigeration oil to decomposition.

6. A refrigeration or heat pump working fluid in accordance with claim 5 in which the refrigeration oil is alkylbenzene lubricating oil.

7. A refrigeration or heat pump working fluid in accordance with claim 6 in which the alkylbenzene is a mixture of mono-substituted branched-chain alkylbenzenes having an average molecular weight in the range of from about 300 to 470.

8. A refrigeration or heat pump working fluid in accordance with claim 7 in which the higher fatty acid is oleic acid and the hydrocarbyl phosphate ester is tricresylphosphate.

9. Lubricant suitable for refrigeration or heat pump apparatus comprising a major proportion of alkylbenzene lubricating oil and a minor amount of the combination of higher fatty acid and arylphosphate in synergistic minor amounts sufficient to improve the wear-inhibiting properties of said lubricant and to improve the resistance of said lubricant to decomposition.

* * * * *

UNITED STATES PATENT AND TRADEMARK OFFICE
CERTIFICATE OF CORRECTION

PATENT NO. : 4,199,461
DATED : April 22, 1980
INVENTOR(S) : Sven A. Olund

It is certified that error appears in the above-identified patent and that said Letters Patent are hereby corrected as shown below:

Col. 1, line 66, "refrigerant" should read --refrigeration--.

Col. 2, line 19, "refrigerant" should read --refrigeration--.

Col. 2, line 22, "More" should read -- Most --.

Col. 7, Table III, under $\Delta T$ opposite Test 22, "$44^3$" should read --$144^3$--.

Signed and Sealed this

Seventh Day of October 1980

[SEAL]

Attest:

SIDNEY A. DIAMOND

Attesting Officer    Commissioner of Patents and Trademarks